United States Patent
McEnroe et al.

(10) Patent No.: US 8,943,102 B2
(45) Date of Patent: Jan. 27, 2015

(54) ALARM MANAGEMENT SYSTEM

(75) Inventors: Brendan S McEnroe, Leeds (GB);
Nigel Barke, Sheffield (GB)

(73) Assignee: British Telecommunications Public Limited Company, London (GB)

( * ) Notice: Subject to any disclaimer, the term of this patent is extended or adjusted under 35 U.S.C. 154(b) by 1684 days.

(21) Appl. No.: 12/096,885

(22) PCT Filed: Jan. 16, 2007

(86) PCT No.: PCT/GB2007/000113
§ 371 (c)(1),
(2), (4) Date: Jun. 10, 2008

(87) PCT Pub. No.: WO2007/093756
PCT Pub. Date: Aug. 23, 2007

(65) Prior Publication Data
US 2008/0320045 A1    Dec. 25, 2008

(30) Foreign Application Priority Data
Feb. 16, 2006 (EP) .................. 06250843

(51) Int. Cl.
*G06F 17/30* (2006.01)
*G05B 23/02* (2006.01)
*G06F 11/07* (2006.01)
*H04L 12/24* (2006.01)

(52) U.S. Cl.
CPC ........ *G05B 23/0264* (2013.01); *G05B 23/0235* (2013.01); *G06F 11/0709* (2013.01); *G06F 11/0781* (2013.01); *H04L 41/0613* (2013.01); *G06F 11/0754* (2013.01)
USPC .......................................... 707/802; 707/723

(58) Field of Classification Search
CPC ................................................. G06F 17/30864
USPC ................... 707/705, 758, 723, 802; 340/506
See application file for complete search history.

(56) References Cited

U.S. PATENT DOCUMENTS

| 5,923,247 A * | 7/1999 | Dowden et al. ............... 340/506 |
| 6,766,368 B1 * | 7/2004 | Jakobson et al. ............. 709/224 |
| 2002/0029266 A1 | 3/2002 | Tse et al. |
| 2002/0050926 A1 | 5/2002 | Lewis et al. |

FOREIGN PATENT DOCUMENTS

WO   02/086750   10/2002

OTHER PUBLICATIONS

International Search Report for International Application No. PCT/GB2007/000113, mailed Apr. 5, 2007.

(Continued)

*Primary Examiner* — Shahid Alam
(74) *Attorney, Agent, or Firm* — Nixon & Vanderhye P.C.

(57) ABSTRACT

A system is monitored for event reports, which are delivered and stored in a first database (12). Data flood conditions are identified by monitoring this database (12) to identify event reports having predetermined characteristics whose occurrence exceeds a predetermined flood threshold value, such characteristics being stored in a second database (13). The data flood conditions are contained by retrieving the stored characteristics from the second database (13) and purging the first database (12) of event reports having those characteristics.

17 Claims, 3 Drawing Sheets

(56) References Cited

OTHER PUBLICATIONS

Gardner, R.D. et al., "Methods and Systems for Alarm Correlation", GLOBECOM '96. Communications: The Key to Global Prosperity, vol. 1, No. 18, pp. 136-140, (Nov. 18, 1996).
Written Opinion of the International Searching Authority (6 pgs.) issued in International Application No. PCT/GB2007/000113.
Applicant Response (2 pgs.) dated Mar. 9, 2009 in European Application No. 07 704 914.6.
Communication (5 pgs.) dated Jul. 10, 2009 issued in European Application No. 07 704 914.6.
Applicant Response (7 pgs.) dated Sep. 28, 2009 in European Application No. 07 704 914.6.

* cited by examiner

ALARM MANAGEMENT SYSTEM

This application is the U.S. national phase of International Application No. PCT/GB2007/000113, filed 16 Jan. 2007, which designated the U.S. and claims priority to filed European Application No. 06250843.7, filed 16 Feb. 2006, the entire contents of each of which are hereby incorporated by reference.

BACKGROUND

1. Technical Field of Example Embodiments of the Present Invention

This invention relates to the management of alarm signals in a monitoring system. Such systems are configured to receive signals from the devices being monitored in the event of a condition exceeding a predetermined value, or some other condition indicative of a malfunction or other condition requiring attention or recording.

2. Description of Related Art

In the alarm management environment it is often possible for a malfunctioning device or service to flood the monitoring system with alarms. In order to record these alarms in a way that is convenient for the user to understand, it is common for duplicated alarms to be recorded as a single event with an incrementing tally to record the number of occurrences. This allows the user to readily identify the elements of the system that are generating a large number of alarms. It also makes it easier for alarms from other elements, raising only one or a few alarms, to be identified from amongst the large total number of alarms.

However, very large numbers of alarm events can overwhelm the system and it may be unable to rationalise these event floods, resulting in large volumes of event reports being generated. If these event floods are not stopped at source quickly, they have a crippling effect on the alarm management system.

Systems are known in which filter criteria are applied to prevent overload by repeated alarms having predetermined characteristics. However, these require pre-characterisation of the overload conditions that are to be identified.

BRIEF SUMMARY OF EXAMPLE EMBODIMENTS OF THE PRESENT INVENTION

Example embodiments of the present invention avoid this situation by identifying and restricting event floods. According to example embodiments of the invention, there is provided a method of monitoring a system for event reports, wherein event reports are delivered and stored in a first database, and wherein data flood conditions are identified by monitoring the first database to identify event reports having characteristics whose occurrence in the first database exceeds a predetermined flood threshold value, such characteristics being stored in a second database, and wherein such data flood conditions are contained by retrieving such stored characteristics from the second database to identify subsequent event reports having the retrieved characteristics.

According to another aspect, there is provided an event monitoring system, comprising a first database for receiving and storing event reports from one or more external systems, flood identification means for monitoring the first database to identify event reports having characteristics whose occurrence in the first database exceeds a predetermined flood threshold value, a second database for storing such characteristics, and flood containment means comprising means for retrieving such stored characteristics from the second database, and means to identify subsequent event reports having the retrieved characteristics.

Thus, the operation of the system is based on two concurrent threads, namely flood identification and flood containment. Once an event flood has been detected, any alarms from the particular component or device may be removed from the monitoring system by purging the first database of event reports having the said characteristics.

The identification process and the containment process may take place periodically. Preferably, the containment process is more frequent than the identification process.

Different flood threshold levels may be set for different devices reporting to the system, and also (at lower levels) for individual components of such devices. Depending on the nature of the events being reported, the report of the event flood may take the form of an alert to a human operator, or merely a recordal of the event flood.

In a preferred arrangement a report is generated of the occurrence of the exceeding of the predetermined flood threshold value by event reports having the predetermined characteristics, so that a single alarm notifying the event flood itself is generated or incremented in place of a large number of individual alarms.

BRIEF DESCRIPTION OF THE DRAWINGS

An embodiment of the invention will now be described, by way of example, with reference to the Figures, in which.

DETAILED DESCRIPTION OF EXAMPLE EMBODIMENTS OF THE PRESENT INVENTION

Figure 1:
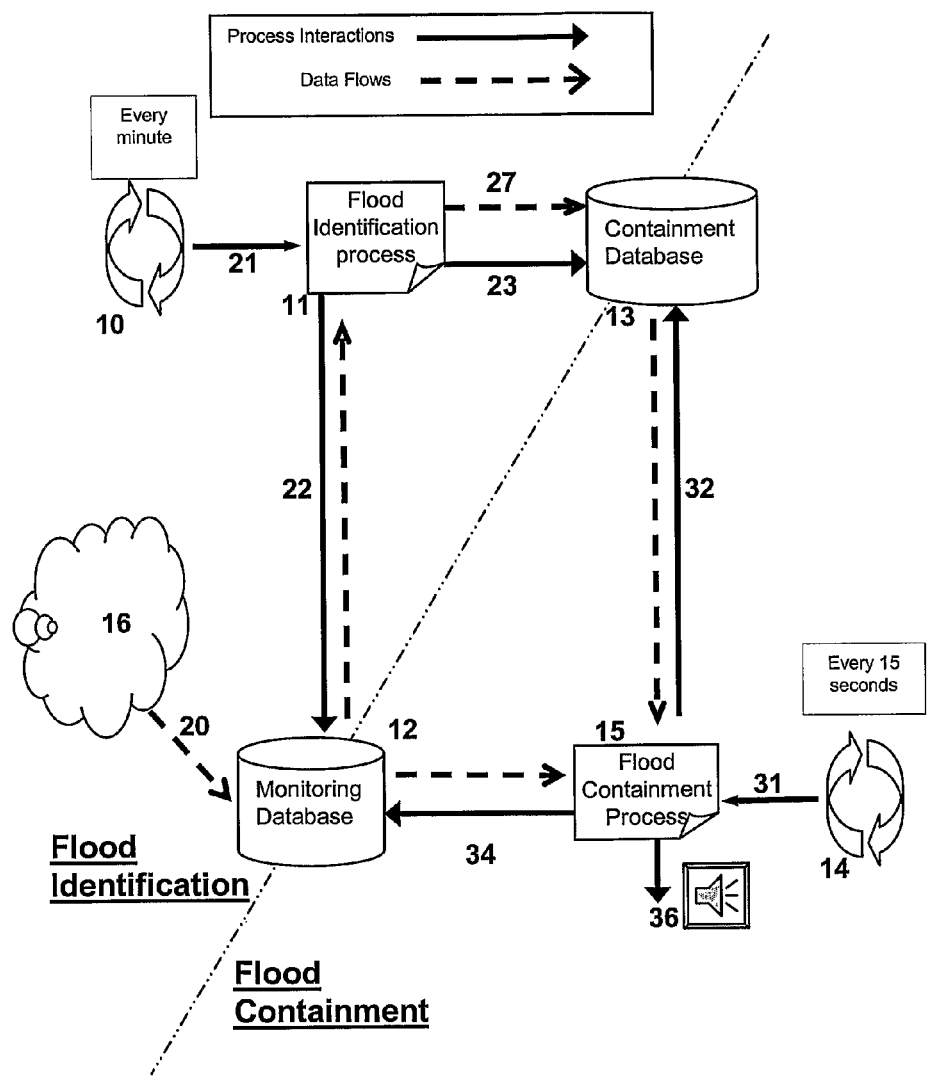
FIG. 1 illustrates the various elements that co-operate to form example embodiments of the invention, and the message flows between them.

Referring firstly to FIG. 1, there is depicted a monitoring database 12 and a containment database 13. Each of these databases 12, 13 is monitored on a cyclical basis under the control of respective clocks 10, 14, in accordance with respective control processors 11, 15. Each control processor 11, 15 uses the data obtained from one of the databases (12, 13 respectively) to modify the data in the other database (13, 12 respectively), as will be described.

The system 16 being monitored delivers fault alarms 20 to the monitoring database 12 as they arise. A malfunctioning component or other problem may result in a large number of such alarms being delivered. This can overload the database 12, resulting in loss of data. Moreover, even if the database is not overloaded, it may be difficult for a user to identify any individual alarms from other components from among the large number of alarm reports from the malfunctioning component.

Figure 2:
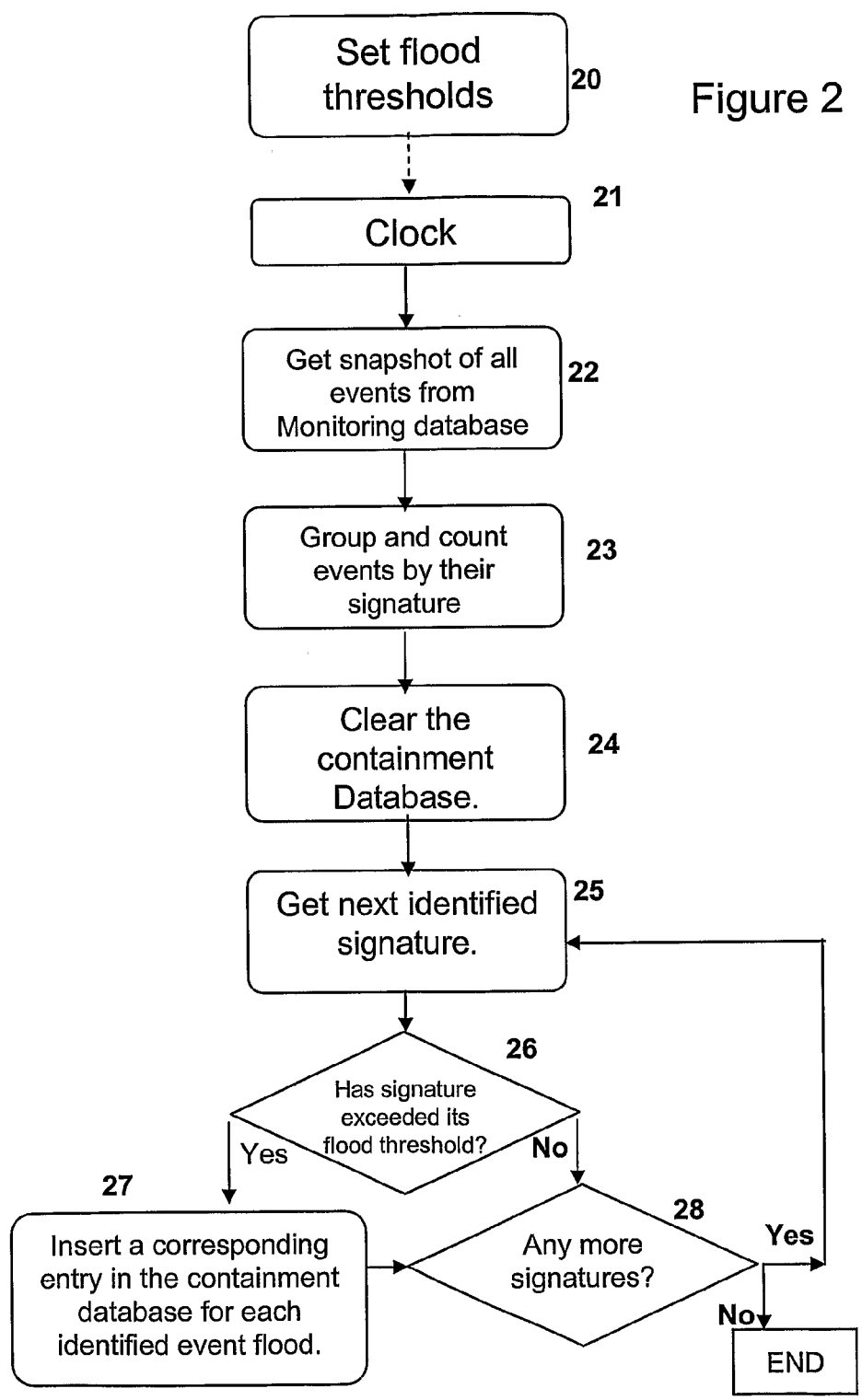
FIG. 2 is a flow diagram illustrating the flood identification process.
Figure 3:
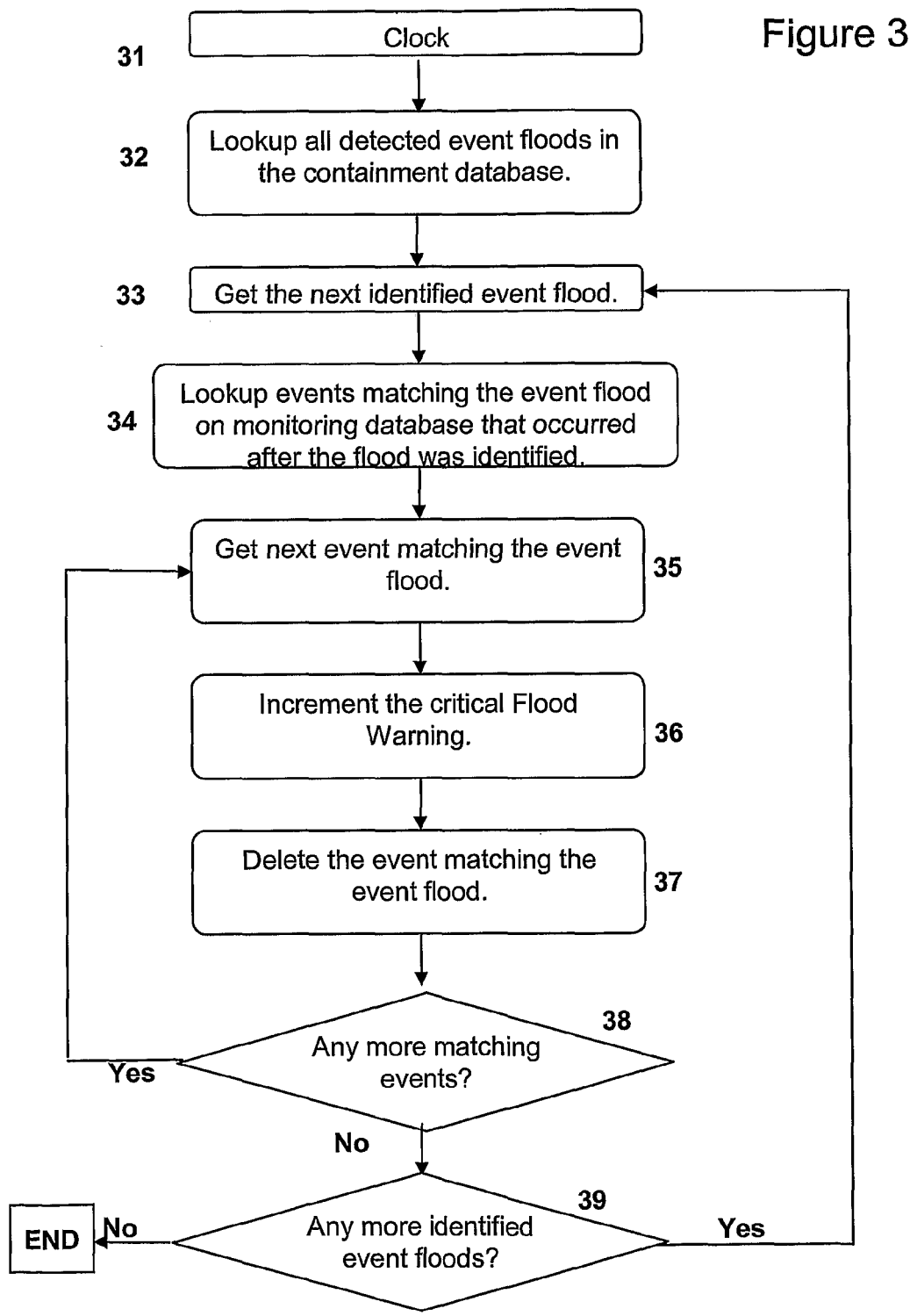
FIG. 3 is a flow diagram illustrating the flood containment process

The system according to example embodiments of the invention operates two separate but related processes, shown in more detail in FIGS. 2 and 3, namely flood identification (steps 20-29) and flood containment (steps 31-39). (The diagonal chain-dotted line in FIG. 1 separates these processes from each other). The processes operate independently, on different cycles, under the control of respective clocks 10, 14. Typically, the clock cycle 21 for the containment process operates every 15 seconds, whilst the clock cycle 31 for the identification process operates less frequently, such as every minute.

FIG. 2 shows the flood identification process in more detail. Initially threshold values are set (step 20). These may be set to different values depending on the source of the alarms, their severity, and other criteria. The flood identification process itself is initiated by a signal 21 from the clock 10, in response to which a snapshot 22 is taken of the current state of the monitoring database 12. This is then analysed for possible event floods, by grouping and counting events by their characteristic signatures 23. Such signatures typically include information on the source of the event, its severity, and the elapsed time since the previous occurrence of such an event.

The containment database 13 is then updated. It is first cleared of the data generated in the previous cycle (step 24). Each group of events having a common signature is then retrieved in turn (steps 25, 28) and analysed (step 26). Any group that meets the flood threshold criteria that were set in the initialisation process 20 is then recorded (step 27) in the containment database 13.

FIG. 3 shows the flood containment process in more detail. The flood containment process is initiated by a signal 31 from a clock 14. Typically the clock signal would be more frequent than for the identification process. The process responds to the clock by retrieving 32 the signatures of any event floods that are stored in the containment database 13. It then handles each of the event floods in turn (steps 33, 39), identified by their signatures. For each signature, the processor 15 modifies the data in the monitoring database 12 by retrieving any new events that match the signature of the event flood currently under consideration (step 34). Each such event in the flood is handled in turn (steps 35, 38). For each one, the containment processor 15 generates or increments a counter 36, and may transmit a signal to notify the relevant support personnel of the problem, before deleting the event from the monitoring database 12 (step 37).

In this way, the monitoring database 12 can be purged of a large amount of the data relating to event floods by having a separate system 36 configured especially to handle them. This allows the monitoring database 12 to handle the remaining data more efficiently.

What is claimed is:

1. A method of monitoring a system for event reports, wherein event reports are delivered and stored in a first database, the method comprising:
    identifying, using a processor and memory, data flood conditions by monitoring the first database to identify event reports having characteristics whose occurrence in the first database exceeds a predetermined flood threshold value, such characteristics being stored in a second database, and
    containing such data flood conditions by retrieving such stored characteristics from the second database to identify subsequent event reports having the retrieved characteristics.

2. A method according to claim 1, wherein when the stored characteristics have been retrieved from the second database, the first database is purged of event reports having the said characteristics.

3. A method according to claim 1, wherein a report of each contained event flood is generated.

4. A method according to claim 1, wherein the identification process takes place periodically.

5. A method according to claim 1, wherein the containment process takes place periodically.

6. A method according to claim 1, wherein the containment process is more frequent than the identification process.

7. A method according to claim 1, wherein different flood threshold levels are be set in respect of different devices reporting to the system.

8. A method according to claim 1, wherein different flood threshold levels are set for complete devices reporting to the system and for individual components of such devices.

9. A method according to claim 1, wherein data stored in the first database is modified by retrieving event reports corresponding to the stored characteristics retrieved from the second database.

10. An event monitoring system comprising:
    a first database for receiving and storing event reports from one or more external systems,
    a processor having a configuration to provide flood identification, including having a configuration to monitor the first database to identify event reports having characteristics whose occurrence in the first database exceeds a predetermined flood threshold value, and to store the characteristics of reports so identified in a second database, and
    a processor having a configuration to provide flood containment, including having a configuration to retrieve such stored characteristics from the second database, and to identify subsequent event reports having the retrieved characteristics.

11. An event monitoring system according to claim 10, wherein the processor having a configuration to provide flood containment has a configuration to purge the first database of event reports having the said characteristics when the stored characteristics have been retrieved from the second database.

12. An event monitoring system according to claim 10, further comprising a report generator configured to generate a report of each contained event flood.

13. An event monitoring system according to claim 10, comprising a clock configured to control periodic operation of the processor having a configuration to provide flood identification.

14. An event monitoring system according to claim 10, comprising a clock configured to control periodic operation of the processor having a configuration to provide flood containment.

15. An event monitoring system according to claim 10, wherein the processor having a configuration to provide flood identification is arranged to set different flood threshold levels in respect of different devices reporting to the system.

16. An event monitoring system according to claim 10, wherein the processor having a configuration to provide flood identification is arranged to set different flood threshold levels in respect of complete devices reporting to the system and of individual components of such devices.

17. An event monitoring system according to claim 10, wherein the processor having a configuration to provide flood identification modifies data stored in the first database by retrieving event reports corresponding to the stored characteristics retrieved from the second database.

* * * * *